Figure 1:
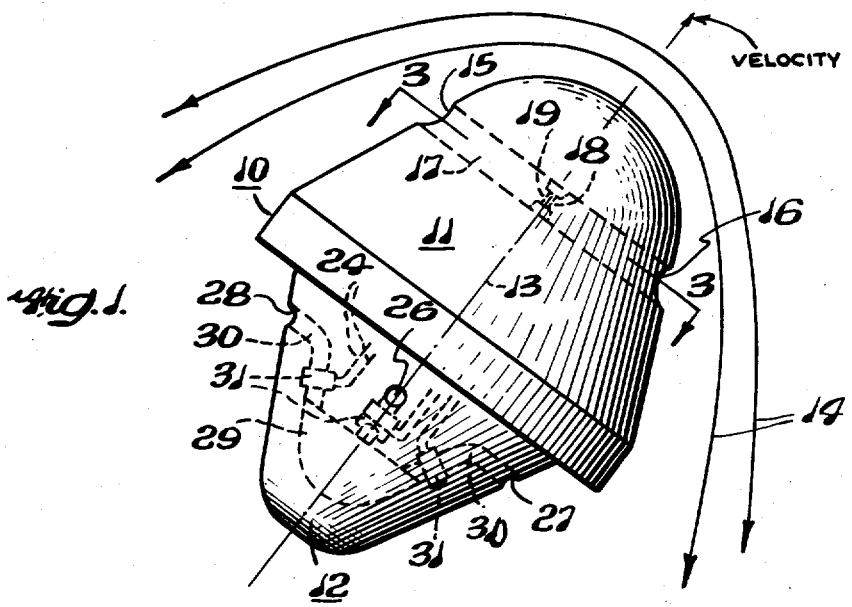

Sept. 6, 1960 Y. A. YOLER 2,951,659
ATTITUDE SENSING AND CONTROL SYSTEM
Filed March 11, 1957 2 Sheets-Sheet 1

INVENTOR
YUSUF A. YOLER
BY Alfred B. Levine
ATTORNEY

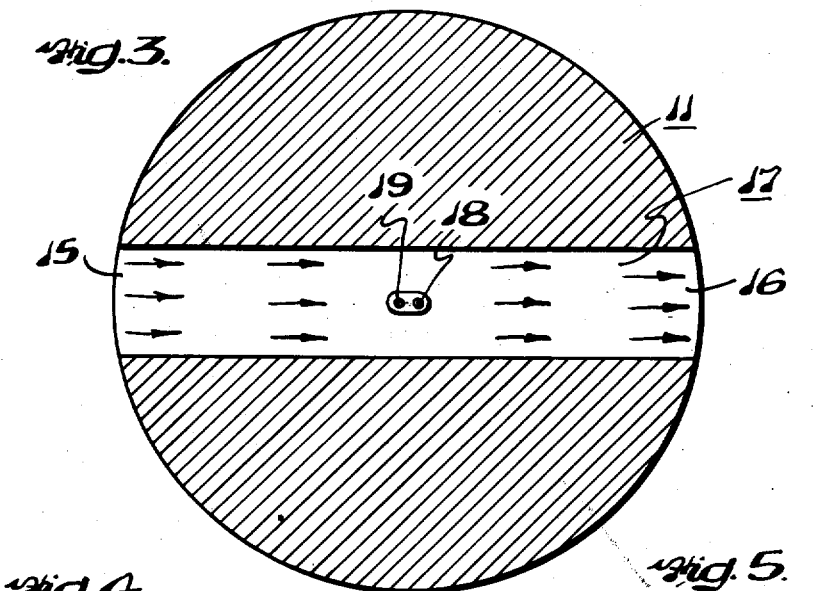
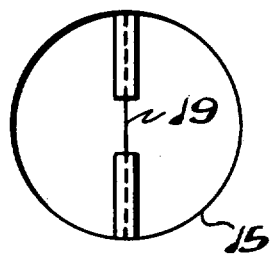
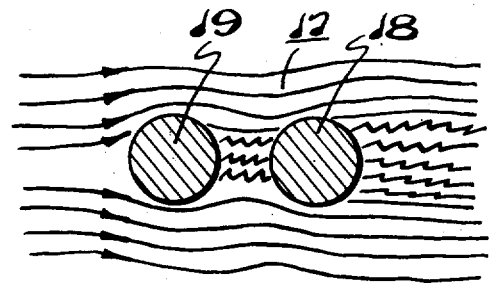
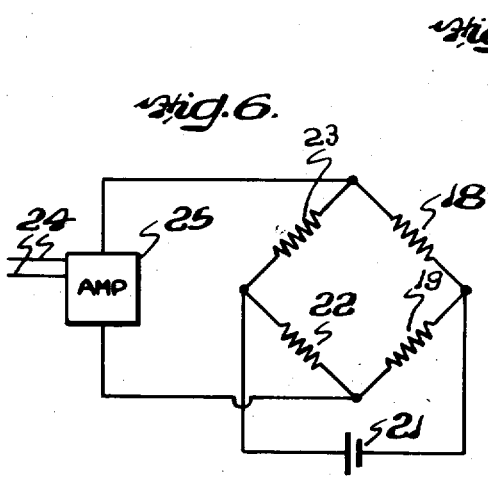
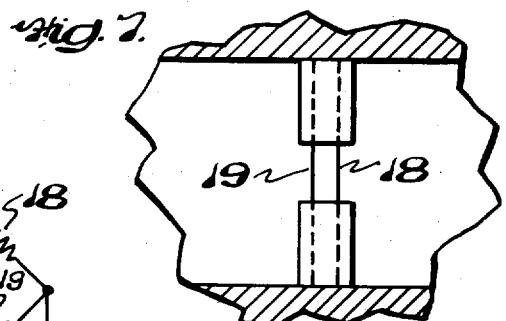
INVENTOR
YUSUF A. YOLER

United States Patent Office 2,951,659
Patented Sept. 6, 1960

2,951,659
ATTITUDE SENSING AND CONTROL SYSTEM

Yusuf A. Yoler, Rosemont, Pa., assignor to General Electric Company, a corporation of New York Filed Mar. 11, 1957, Ser. No. 645,252

8 Claims. (Cl. 244—14)

This invention generally relates to attitude control systems for vehicles, and more particularly to such systems finding particular utility in the attitude control of space vehicles reentering the earth's atmosphere from outer space on a return flight to the earth.

One of the serious problems arising during a space travelling vehicle's return to the earth is extreme heating as it passes through the relatively dense atmospheric blanket encircling the earth. As is well known this heating is so great as to result in the burning and destruction, within a few moments, of metallic meteors entering the atmosphere under similar conditions. Still another serious problem is that of maintaining the dynamic stability of the vehicle as it is subjected to such extreme stresses. These and other problems require that the vehicle enter the atmosphere at a desired attitude for which it has been designed and constructed; and that the vehicle maintain this attitude within reasonably precise limits during its passage through the atmosphere.

Heretofore navigable vehicles for water or air have employed elaborate attitude sensing devices such as accelerometers, gyroscopes, or other instruments to measure vehicle position, acceleration, or velocity from an initially established preset reference and perhaps, in addition, provide means for correcting this preset reference from time to time during travel. However, such devices are relatively unsatisfactory for long distance craft of this type, since instrument drift and other errors are integrated during time of travel resulting in intolerable errors in the initially established reference point. Consequently these devices do not provide the necessary accuracy or sensitivity for applications such as intercontinental or interplanetary travel.

In accordance with the present invention there is provided a unique system that determines correct attitude by sensing the instantaneous condition of fluid flow about the vehicle rather than by actual or predicted deviation or change from a preset reference. More specifically, the present invention includes means for continuously determining the differential flow characteristics of the atmosphere about the vehicle, and from this information controls the vehicle attitude so as to maintain a desired differential flow.

Considering one specific example, the present invention might be applied to maintain a symmetrically shaped vehicle at zero angle of attack, where angle of attack is defined as the deviation between the vehicle longitudinal axis of symmetry and the vehicle flight velocity vector.

It is accordingly one object of the present invention to provide a system of increased accuracy and sensitivity for sensing and controlling the attitude of long range vehicles at high altitudes.

A still further object of the present invention is to provide such a system for controlling the attitude of vehicles entirely by means of the environmental flow condition of the fluid through which it passes rather than by sensing its deviation from a preset reference condition.

Figure 2:
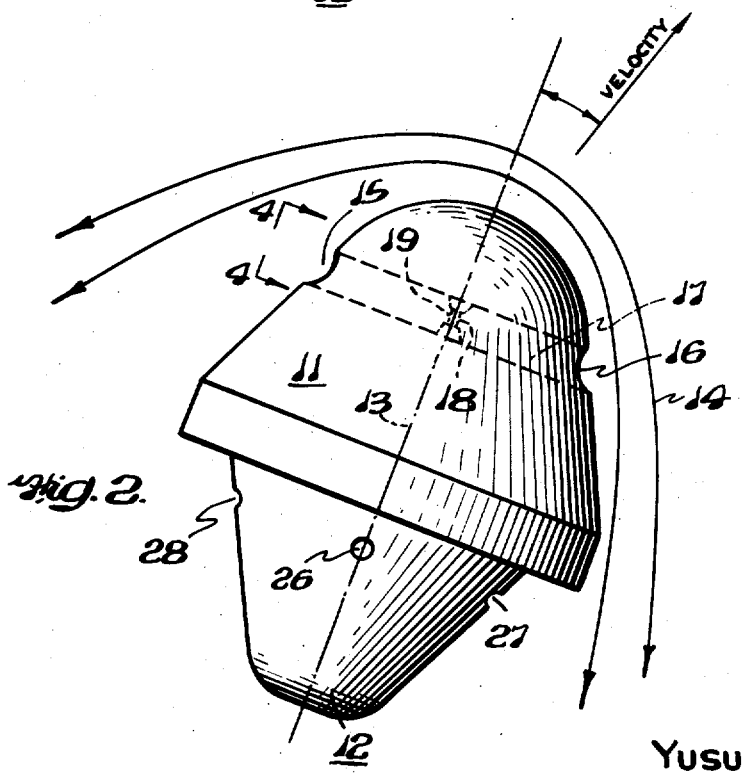

Other objects and many attendant advantages of this invention will be more readily comprehended by those skilled in the art upon a detailed consideration of the following specification taken with the accompanying drawings wherein:

Figs. 1 and 2 are perspective views schematically illustrating a flight vehicle and the atmospheric flow conditions, about the vehicle, Fig. 3 is a cross sectional view through line 3—3 of Fig. 1, Fig. 4 is an end elevation along lines 4—4 of Fig. 2, Fig. 5 is an enlarged view in cross section depicting air flow about the preferred hot wire sensing means, Fig. 6 is an electrical schematic illustrating a portion of the control system and, Fig. 7 is a side elevation of the sensing means of Figs. 3 and 4.

Referring now to Fig. 1 for a detailed consideration of one preferred embodiment of the present invention, there is shown an axially symmetrical flight vehicle generally designated 10, comprised of a main body portion 11 and an after body portion 12, that is travelling along a flight path 13 aligned with its longitudinal axis of symmetry or at zero angle of attack.

For purposes of this discussion, flight vehicle 10 may be an intercontinental or interplanetary travelling vehicle approaching the earth or other planet and reentering the outer portion of the atmosphere at an altitude of perhaps 100,000 feet. Assuming also that this vehicle is travelling at hypersonic speed (above Mach 5), as this vehicle enters the dense atmosphere blanket above the earth, tremendous heat and pressure are imposed upon the vehicle as a result of friction and compression of the atmosphere.

Under these conditions it is necessary that the vehicle enter the atmosphere at the precise attitude for which it has been designed, for the purpose of enabling the vehicle to be dynamically stabilized and for the purpose of localizing the heating on certain portions of the vehicle which have been designed to withstand and/or dissipate the heat. In the example shown by Figs. 1 and 2, it is assumed that vehicle 10 is required to enter the atmosphere at zero angle of attack.

If this vehicle 10 enters the atmosphere at zero angle of attack as shown by Fig. 1, the atmospheric fluid flow, generally shown by lines 14 are symmetrically disposed about the forward portion of the vehicle and the atmospheric pressures on opposite sides of the vehicle, such as at points 15 and 16 are equal. On the other hand, if vehicle 10 enters the atmosphere at an angle of attack other than zero as shown by Fig. 2, the flow is not symmetrically disposed about the vehicle longitudinal axis 13 and a fluid pressure differential exists between points 15 and 16 on opposite sides of the vehicle body.

In accordance with the present invention means are provided for measuring the magnitude and direction of any such pressure differential and employing this quantity to control the vehicle attitude in such a manner as to correct for any such pressure differential and return the vehicle to zero angle of attack. Thus, by means of the present invention, means are provided for employing the environmental condition of the fluid through which the vehicle is passing for correcting the vehicle attitude in such a manner as to obtain a desire fluid flow. This is to be contrasted with prior attitude control systems which predetermine the attitude of a travelling body by means of a gyroscopic or other space reference and use the deviation of vehicle attitude from this predetermined reference to control the attitude of the vehicle and bring it into alignment with the preestablished reference.

As is well known to those skilled in the art, the pressure differential on opposite sides of such a vehicle 10 at altitudes of 50,000 feet or greater above the earth is extremely small and at the present time no adequate pressure measuring devices having sufficient accuracy and sensitivity are available meeting the weight, complexity, and other requirements of such an intercontinental or interplanetary vehicle.

In accordance with the present invention, however, there is provided a means for measuring the flow of fluid resulting from the differential pressure rather than measuring the differential pressure itself; and as shown by Fig. 1, this means include a small opening 17 passing through the forward portion 11 of vehicle 10 from opposite sides 15 and 16. As a differential fluid pressure is exerted on opposite sides of this forward portion 11 there results a flow of the fluid through opening 17 from points 15 to 16 or the reverse depending upon the direction of deviation from zero angle of attack. Positioned within this opening 17 is a means for measuring the differential fluid flow and the direction of this fluid flow; and such means preferably comprise two hot wires 18 and 19 positioned back to back in a direction transverse to the opening 17 as shown by Figs. 3, 4 and 7.

Wires 18 and 19 may be high resistance wires connected as opposite arms in a Wheatstone type bridge circuit (Fig. 6) energized by a source 21 of sufficient voltage. These wires are suitably energized to maintain these wires in a heated condition. The two remaining arms of the bridge may be resistors 22 and 23 of fixed value as shown. With this arrangement, should wire 19 receive more cooling by the fluid flow, its resistance varies more than that of wire 18 and a voltage output of one polarity is generated across bridge output lines 24 and amplified by amplifier 25. Conversely, should wire 18 receive more cooling than 19, a voltage of opposite polarity is generated by the bridge across output lines 24.

To control the relative cooling of the two hot wires 19 and 18 as a function of the direction of fluid flow through vehicle opening 17, the two wires are preferably placed close together and arranged in line with the direction of opening 17. In this position, fluid flow from left to right, for example, as depicted by Fig. 5 strikes and flows about wire 19 creating a turbulent wake flowing around about wire 18. The turbulent flow about wire 18 produces a different cooling effect than the laminar flow about wire 19 and, as a result, wire 19 assumes a different resistance value than 18 and the voltage output across lines 24 of the bridge circuit has an amplitude and polarity indicating the magnitude of fluid flow from left to right. Conversely, fluid flow in the opposite direction through opening 17 produces a turbulent wake about wire 19 and the voltage output across lines 24 of the bridge is of the opposite polarity. By this arrangement, it is evident that the two hot wires 19 and 18 provide a direction responsive measurement of the fluid flow through opening 17.

As is well known to those skilled in the art, hot wires of this type are extremely sensitive to very small flow variations whereby this arrangement produces a highly sensitive and accurate determination of the direction and magnitude of flow through opening 17. In fact, much greater sensitivity and accuracy are obtainable with such flow determining devices than might be obtainable if differential pressure measuring devices were positioned near opposite sides 15 and 16 of the opening 17, since fluid pressure in the rare atmosphere at altitudes above 50,000 feet is extremely small.

For restoring the vehicle to its correct attitude in response to these electrical signals, a plurality of jet nozzles 26, 27 and 28, adapted to expel compressed gas are provided about the outer surface of the vehicle afterbody portion 12. As best shown by Fig. 1, the compressed gas for expulsion through these nozzles is preferably stored in highly compressed form within a suitable tank 29 or the like housed within the vehicle, and conducted by means of pipes 30 and through electrically operated differential valves 31 to the nozzles. As a voltage of one polarity is generated across bridge output lines 24, this voltage opens one or more of these valves 31 allowing the compressed gas to enter and be expelled from the appropriate nozzles, thereby exerting a torque upon the vehicle in such a direction as to turn it about its axis and restore its attitude to that desired.

Due to the rare atmosphere and low pressure existing at these high altitudes, rapid turning and attitude control of such a vehicle is not obtainable by using rudders, ailerons or other vane-like members outstanding from the vehicle and hence, compressed gas ejection means, as described above, is preferred. However, other actuating means, such as means for internally exerting an inertial force upon the vehicle, may be employed.

Although the flow sensing means described above is limited to the sensing of vehicle attitude about but one of its flight axes, it is evident that control of the vehicle about all three of its flight axes may be easily obtained in accordance with the present invention by providing additional openings through the craft similar to opening 17 within which are contained suitably positioned pairs of hot wires, each of which is connected in a bridge circuit similar to Fig. 6. The signals from each of these sensing channels may then be directed over output lines similar to 24 to control the ejection of compressed air through the jet nozzles in the afterbody portion 12 of the vehicle that are suitably arranged to controllably position the vehicle in space about the different ones of its axes.

Although but one preferred embodiment of the invention has been illustrated and described, it is believed evident to those skilled in the art that many changes may be made without departing from the spirit or scope of the invention.

Accordingly, this invention is to be considered as being limited only by the following claims appended hereto.

What is claimed is:

1. In an attitude control system for vehicles travelling at high altitudes and hypersonic speed, flow sensing means responsive to atmospheric fluid flow for generating a signal proportional to the vehicle angle of attack, and means responsive to said signal for varying the attitude of said vehicle, said flow sensing means being operable in a rare atmosphere.

2. In an attitude control system for vehicles travelling at high altitudes and hypersonic speed, flow sensing means for determining the differential atmospheric flow about opposite sides of the vehicle, means operable in a rare atmosphere for generating a signal proportional in magnitude and polarity to said differential flow, and means responsive to said signal for varying the attitude of said vehicle.

3. In a system for controlling the attitude of a vehicle travelling at hypersonic speed and in rare atmospheres, flow sensing means operable in a rare atmosphere for determining the differential atmospheric flow on opposite sides of the forward portion of the vehicle and generating a signal proportional thereto, and means responsive to said signal for varying the attitude of said vehicle to maintain a desired differential flow.

4. In a system for controlling the attitude of a vehicle travelling at hypersonic speed and in rare atmospheres, means for determining the differential fluid flow about opposite sides of the forward portion of the vehicle and generating a signal proportional thereto, said means including a means defining an opening passing through the vehicle proximate its forward nose portion, means positioned within said opening for measuring fluid flow and direction of fluid flow through said opening, and means responsive to said signal for varying the attitude of said vehicle to maintain a desired differential flow.

5. In an attitude control system for vehicles travelling at hypersonic speed, means for generating a signal proportional to the vehicle angle of attack, said angle of attack generating means including means defining an opening passing transversely through the vehicle proximate its forward portion, and means positioned within said opening for measuring fluid flow and direction of fluid flow through said opening and generating electrical signals proportional thereto, and means responsive to said electrical signals for varying the attitude of said vehicle.

6. In the system of claim 5 said means for varying the attitude of said vehicle including a plurality of nozzles positioned about the rear portion of said vehicle, a tank containing highly compressed fluid housed within said vehicle, and electrically operated means actuated by said electrical signal for conveying the compressed fluid through said nozzles.

7. In the system of claim 2, said generating means including a pair of heated electrical wires placed in linear alignment and means associated with said vehicle for directing the differential atmospheric flow past said wires in a direction transverse to said aligned wires.

8. In the system of claim 4, said measuring means including a pair of heated electrical wires placed in linear alignment in the direction of said opening.

References Cited in the file of this patent

UNITED STATES PATENTS

| | | |
|---|---|---|
| 2,214,181 | Rylsky | Sept. 10, 1940 |
| 2,400,701 | Meredith | May 21, 1946 |
| 2,420,932 | Cornelius | May 20, 1947 |
| 2,628,793 | Stalker | Feb. 17, 1953 |
| 2,644,397 | Katz | July 7, 1953 |
| 2,813,424 | Liepmann | Nov. 19, 1957 |